United States Patent
Chen et al.

(10) Patent No.: US 8,930,852 B2
(45) Date of Patent: Jan. 6, 2015

(54) TOUCH SCREEN FOLDER CONTROL

(75) Inventors: Ting-Pang Chen, New Taipei (TW);
Chih-Hsiang Lin, New Taipei (TW);
Shao-Chieh Lin, New Taipei (TW);
Chia-Hui Feng, New Taipei (TW);
Yi-Hsun Liu, New Taipei (TW);
Ching-Sheng Tsai, New Taipei (TW)

(73) Assignee: Acer Incorporated, New Taipei (TW)

( * ) Notice: Subject to any disclaimer, the term of this patent is extended or adjusted under 35 U.S.C. 154(b) by 180 days.

(21) Appl. No.: 13/559,731

(22) Filed: Jul. 27, 2012

(65) Prior Publication Data

US 2013/0239059 A1 Sep. 12, 2013

(30) Foreign Application Priority Data

Mar. 6, 2012 (TW) .............. 101107415 A

(51) Int. Cl.
*G06F 3/048* (2013.01)
*G06F 3/0488* (2013.01)
(52) U.S. Cl.
CPC .............. *G06F 3/0488* (2013.01); *G06F 3/048* (2013.01)
USPC ............................ 715/835; 715/821; 715/825
(58) Field of Classification Search
USPC ......................................................... 715/835
See application file for complete search history.

(56) References Cited

U.S. PATENT DOCUMENTS

| | | | |
|---|---|---|---|
| 7,479,949 B2 * | 1/2009 | Jobs et al. ................... | 345/173 |
| 7,730,425 B2 * | 6/2010 | de los Reyes et al. ........ | 715/835 |
| 8,209,606 B2 | 6/2012 | Ording | |
| 8,209,630 B2 | 6/2012 | Thimbleby et al. | |
| 8,271,907 B2 * | 9/2012 | Kim et al. ..................... | 715/863 |
| 8,375,336 B2 * | 2/2013 | Matthews et al. ............. | 715/863 |
| 8,423,911 B2 * | 4/2013 | Chaudhri ...................... | 715/835 |
| 8,423,916 B2 * | 4/2013 | Chihara et al. ............... | 715/863 |
| 8,456,297 B2 * | 6/2013 | van Os .................... | 340/539.13 |
| 8,458,615 B2 * | 6/2013 | Chaudhri ...................... | 715/803 |
| 8,493,333 B2 * | 7/2013 | Kang et al. .................... | 345/173 |
| 8,510,665 B2 * | 8/2013 | Ording et al. ................. | 715/763 |

(Continued)

FOREIGN PATENT DOCUMENTS

EP 2549369 A2 1/2013
WO 2009048240 A2 4/2009

OTHER PUBLICATIONS

European Search Report, EP12007955, Feb. 13, 2014, 10 pages.

(Continued)

*Primary Examiner* — David Phantana Angkool
(74) *Attorney, Agent, or Firm* — Edell, Shapiro & Finnan, LLC

(57) ABSTRACT

Techniques are provided for manipulating folder and file icons on a screen of an electronic device. A folder icon representing a folder is displayed on a screen, in a first mode, at a first location on the screen. The folder may contain a plurality of individual files and the folder icon is configured to indicate the plurality of individual files. An activation event is detected comprising a movement from the first location on the screen to a second location on the screen. In response to detecting the activation event, the folder icon is displayed on the screen along with icons representing the individual files on the screen. The screen may display the icons of the individual files as fanning out from the folder icon and/or may display the icons of the individual files entirely outside of the folder icon.

17 Claims, 6 Drawing Sheets

(56) References Cited

U.S. PATENT DOCUMENTS

| | | |
|---|---|---|
| 8,539,387 B1 * | 9/2013 | Lin et al. .................... 715/863 |
| 8,707,204 B2 * | 4/2014 | Horvitz et al. ............... 715/804 |
| 2009/0307623 A1 | 12/2009 | Agarawala et al. |
| 2010/0211919 A1 | 8/2010 | Brown et al. |
| 2010/0218144 A1 | 8/2010 | Huotari |
| 2011/0296328 A1 | 12/2011 | Jikeya |
| 2012/0151397 A1 | 6/2012 | Oberstein et al. |
| 2012/0162119 A1 | 6/2012 | Forstall et al. |
| 2014/0201689 A1 * | 7/2014 | Bedikian et al. ............. 715/863 |

OTHER PUBLICATIONS

Pash, "Quick Look to See What Files are Inside a Folder", http://lifehacker.com/5373034/tweak-quick-look-to-see-what-files-are-inside-a-folder, Oct. 2, 2009, 2 pages.

* cited by examiner

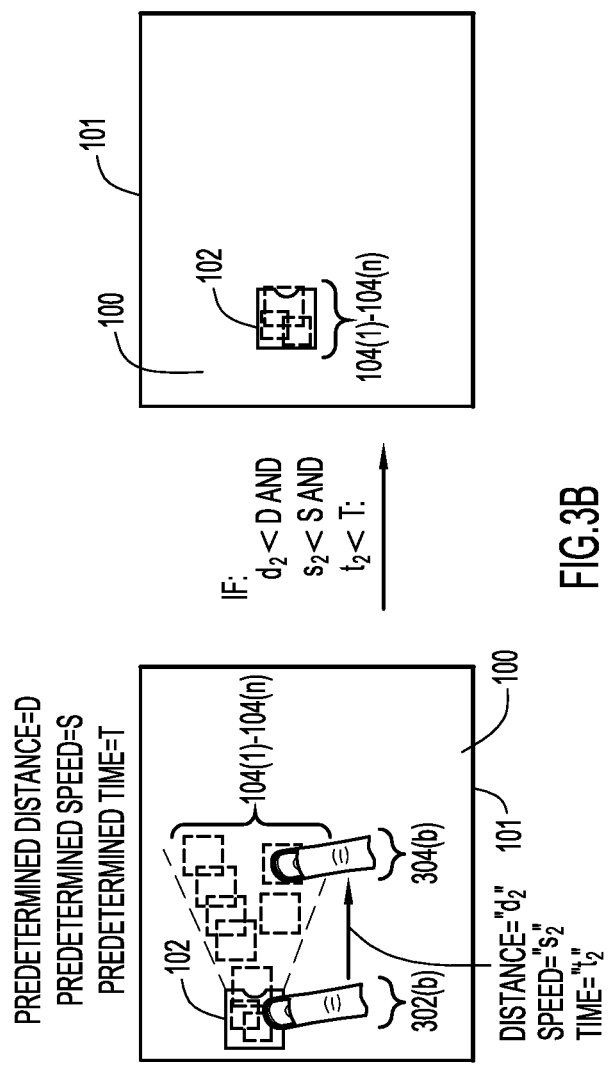

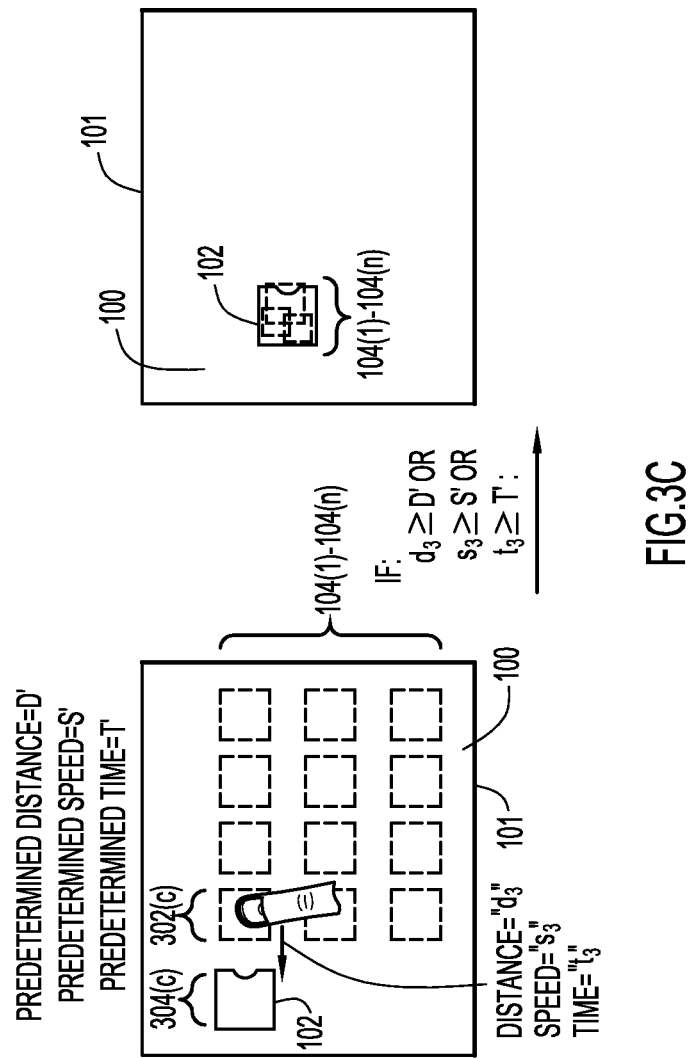

TOUCH SCREEN FOLDER CONTROL

TECHNICAL FIELD

The present disclosure relates generally to viewing files on an electronic device.

BACKGROUND

Electronic devices typically have a user interface through which a user can interact with electronic files stored on the device. With touch screen computing devices, a user may contact a screen of the device to adjust display characteristics of files and file icons. For example, a user may press or tap a location on a screen corresponding to a file icon in order to view or edit the file associated with the file icon. The user may also initiate a contact or series of contacts (e.g., by pressing one or more fingers on the device) to change the display characteristics of the screen and associated files. With typical desktop or laptop computing devices, a user may use a keyboard, mouse, trackpad, etc. to interact with a file icon on a screen of the device. Similarly, the user may initiate a contact or series of contacts (e.g., by clicking one or more times on a mouse) to change the display characteristics of the screen and associated files.

SUMMARY

Techniques are provided for manipulating folder and file icons on a screen of an electronic device. The techniques may be embodied as a method, apparatus or a computer-readable storage media with instructions executable to perform the method. In summary, a folder icon representing a folder is displayed on a screen, in a first mode, at a first location on the screen. The folder may contain a plurality of individual files and the folder icon is configured to indicate the plurality of individual files. An activation event is detected comprising a movement from the first location on the screen to a second location on the screen. In response to detecting the activation event, the folder icon is displayed on the screen along with icons representing the individual files on the screen. The screen may display the icons of the individual files as fanning out from the folder icon and/or may display the icons of the individual files entirely outside of the folder icon.

BRIEF DESCRIPTION OF THE DRAWINGS

FIGS. 3A-3C show the screen of the electronic device transitioning between display modes based on the activation event initiated by the user.

DESCRIPTION OF EXAMPLE EMBODIMENTS

Figure 1A:
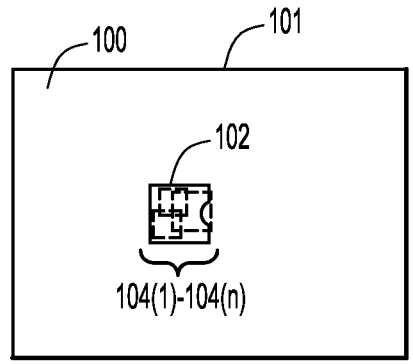
FIGS. 1A, 1B(1), 1B(2) and 1C show a screen of an electronic device in a plurality of display modes configured to display icons associated individual files stored in a folder in response to an activation event initiated by a user.

The techniques described hereinafter involve displaying a folder icon and a plurality of file icons in one or more of a plurality of display modes. FIGS. 1A, 1B(1), 1B(2) and 1C depict the plurality of display modes of a screen 100 of an electronic device 101. The electronic device 101 may be, for example, a tablet computing device, mobile phone, personal digital assistant (PDA), desktop computer, laptop computer, etc. A user of the electronic device 101 can interact with the screen 100 in multiple ways in order to adjust or change the display settings of icons and other images on the screen 100. For example, when the screen 100 is configured as a touch screen, the user can physically contact (e.g., touch) the screen 100 at locations of icons in order to perform electronic operations associated with files and applications of the electronic device 101 displayed on the screen 100. Similarly, the user can initiate an electronic contact (e.g., by clicking a mouse or using a trackpad, stylus, etc.) operating in conjunction with the screen in order to perform these electronic operations. Though embodiments described hereinafter explain the user initiating one or more physical contacts with the screen 100 to perform the display techniques, it should be appreciated that these techniques may be accomplished by analogous electronic contacts performed by the user on the screen 100. For example, an electronic contact comprising a mouse click may be analogous to a physical contact comprising a user touching the screen 100.

The screen 100 may display icons or images in a plurality of display modes, and the screen 100 may change the display mode that is viewable to the user based on the techniques described hereinafter. For example, as shown in FIG. 1A, the screen may display to the user a folder icon, shown at reference numeral 102. The folder represented by the folder icon 102 may contain a plurality of individual files. The individual files are represented by a plurality of corresponding file icons 104(1)-104(n). In FIG. 1A, the file icons 104(1)-104(n) are shown as residing within the folder icon 102. In one example, the folder icon 102 may be displayed with sufficient transparent characteristics such that the user can view or see at least some of the file icons 104(1)-104(n) residing within the folder icon 102.

The folder icon 102 and the file icons 104(1)-104(n) may be displayed to the user in one of a plurality of display modes of the screen 100. FIG. 1A depicts a first display mode of the screen 100, which may also be referred to hereinafter as a "shrink mode." When the screen 100 is in the shrink mode, the file icons 104(1)-104(n) are shown as residing "inside" of the folder icon 102.

FIGS. 1B(1) and 1B(2) depict instances of a second display mode of the screen 100. The second display mode may also be referred to hereinafter as an "intermediate mode" or "fan-out" mode. When the screen 100 is in the intermediate mode, the file icons 104(1)-104(n) fan out or expand across the screen 100 in response to an activation event by the user. For example, as described in detail hereinafter, when a user touches his or her finger on the location of the folder icon 102 and drags the finger across the screen 100, the screen 100 displays the file icons 104(1)-104(n) in the intermediate mode such that the file icons are shows as emanating or fanning out from the folder icon 102 across the screen 100, based on the distance of the dragging event by the user.

FIG. 1B(1) depicts a first instance of the intermediate mode, where the user drags his or her finger to a first location from the location of the file icon 102. FIG. 1B(2) depicts a second instance of the intermediate mode, where the user drags his or her finger to a second location from the location of the file icon 102. In FIG. 1B(2), the user drags the finger at a further distance across the screen 100 when compared to the distance in FIG. 1B(1), and thus, the file icons 104(1)-104(n)

in FIG. 1B(2) are displayed in a larger view to the user when compared to the file icons 104(1)-104(n) displayed to the user in FIG. 1B(1).

In one example, in FIGS. 1B(1) and 1B(2), as the user drags his or her finger across the screen 100, a first portion of the file icons 104(1)-104(n) may be displayed to the user as being entirely outside of the folder icon 102, a second portion of the file icons 104(1)-104(n) may be displayed to the user as being entirely within the folder icon 102 and a third portion of the file icons 104(1)-104(n) may be displayed to the user as being located both within and outside of the folder icon 102 (e.g., file icons being "pulled out" of the folder icon 102).

Figure 1C:
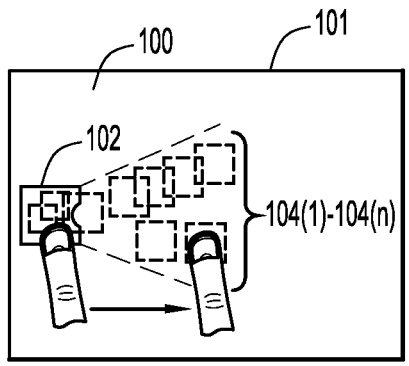
Figure 1C:
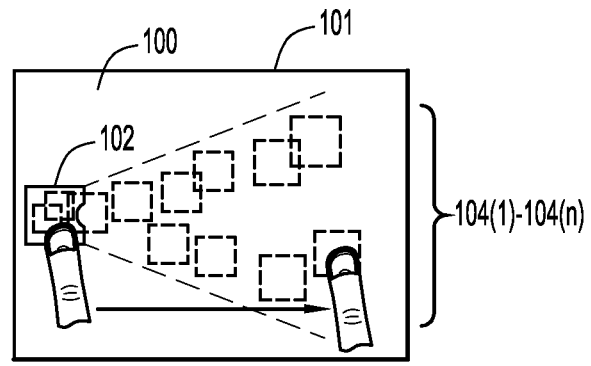
Figure 1C:
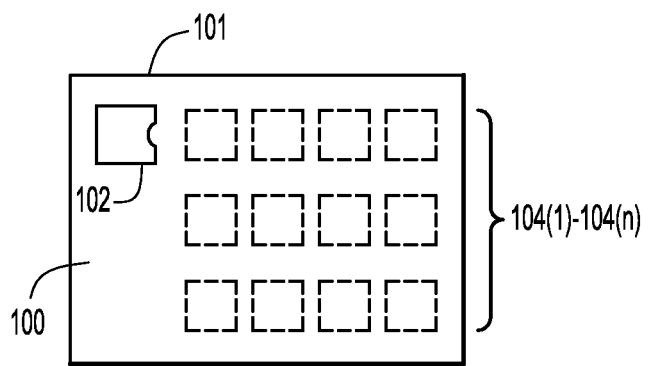

FIG. 1C depicts a third display mode of the screen 100. The third display mode may also be referred to hereinafter as an "expanded mode." When the screen 100 is in the expanded mode, all of the files icons 104(1)-104(n) corresponding to files that are associated with the folder represented by the folder icon 102 are displayed to the user entirely outside of the folder icon 102 (although such file icons 104(1)-104(n) may not all be immediately viewable as they may be too numerous to fit in a single frame of the display).

The individual files represented by the file icons 104(1)-104(n) may be any type of software file. For example, the individual files may be picture files, audio files, video files, document files, etc. Furthermore, the individual files may be stored on the electronic device (e.g., in a memory component of the electronic device) or may be stored remotely (e.g., in a "cloud" or remote storage service) and accessible by the electronic device 101.

As described hereinafter, a user may initiate an activation event (e.g., a physical contact (touch) or an electronic contact (click)) with the screen 100 in order to change how the screen 100 displays the folder icon 102 and the file icons 104(1)-104(n) to the user. For example, the user may initiate an activation event to transition the display modes of the screen 100 shown in FIGS. 1A-1C.

The electronic device 101 is configured with two steady state display modes: the shrink mode and the expanded mode. That is, when no activation is present (e.g., when the user is not making a physical or electronic contact with the screen 100), the screen 100 may display the folder icon 102 and the file icons 104(1)-104(n) only in one of the two steady state display modes. The screen 100 displays the intermediate or fan-out mode to the user only in between steady state modes. For example, as described by the techniques hereinafter, when an activation event is present and when the electronic device 101 is determining whether or not to transition between one of the steady state modes to the other steady state mode, the screen 100 may display the intermediate mode to the user. Once the activation event ends or once the electronic device 101 determines to switch from one steady state mode to the other steady state mode, the screen no longer displays the intermediate mode to the user.

Figure 2:
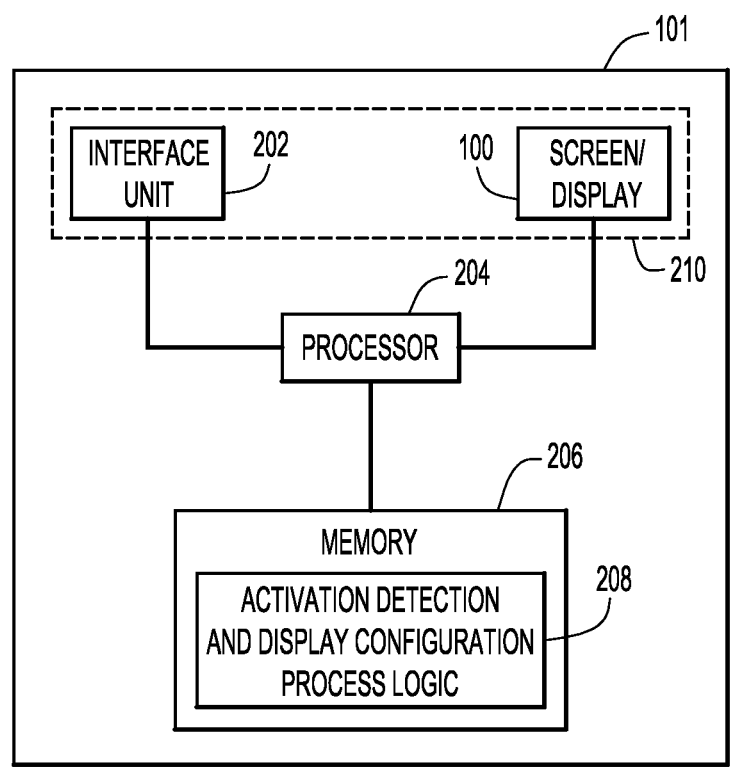
FIG. 2 shows an example block diagram of the electronic device configured with activation detection and display configuration process logic to display the individual files in one of the display modes.

Reference is now made to FIG. 2. FIG. 2 shows a block diagram of the electronic device 101. The electronic device 101 comprises, among other features, a screen ("display") 100, an interface unit 202, a processor 204 and a memory 206. The screen 100, interface unit 202 and memory 206 are coupled to the processor 204. The screen 100 is configured to display images (e.g., the folder icon 102 and the file icons 104(1)-104(n)), as described above, that are associated with the electronic device 101. The interface unit 202 is configured to receive one or more activation events from the user of the electronic device 101. For example, as described above, the interface unit 202 is configured to receive an activation event comprising one or more physical contact (touch) instances from the user (e.g., when the screen 100 is configured as a touch screen) and/or is configured to receive an activation event comprising one or more electronic contact (click) instances from the user. When the screen 100 is a touch screen, the interface unit 202 and the screen 100 may be considered a single unit, as indicated by broken line 210.

The processor 204 is a microprocessor or microcontroller that is configured to execute program logic instructions (i.e., software) for carrying out various operations and tasks described herein. For example, the processor 204 is configured to execute activation detection and display configuration process logic 208 that is stored in the memory 206 to detect an activation event and to determine whether or not to change the display mode of the screen 100 based on the activation event, as described hereinafter. The memory 206 may comprise read only memory (ROM), random access memory (RAM), magnetic disk storage media devices, optical storage media devices, flash memory devices, electrical, optical or other physical/tangible memory storage devices.

The functions of the processor 204 may be implemented by logic encoded in one or more tangible computer readable storage media (e.g., embedded logic such as an application specific integrated circuit, digital signal processor instructions, software that is executed by a processor, etc.), wherein the memory 206 stores data used for the operations described herein and stores software or processor executable instructions that are executed to carry out the operations described herein.

The activation detection and display configuration process logic 208 may take any of a variety of forms, so as to be encoded in one or more tangible computer readable memory media or storage device for execution, such as fixed logic or programmable logic (e.g., software/computer instructions executed by a processor), and the processor 204 may be an application specific integrated circuit (ASIC) that comprises fixed digital logic, or a combination thereof.

For example, the processor 204 may be embodied by digital logic gates in a fixed or programmable digital logic integrated circuit, in which digital logic gates are configured to perform the operations of the activation detection and display configuration process logic 208. In general, the activation detection and display configuration process logic 208 may be embodied in one or more computer readable storage media encoded with software comprising computer executable instructions and when the software is executed operable to perform the operations described herein for the process logic 208.

As described above, a user of the electronic device 101 may initiate an activation event on the screen 100 in order to change the display modes or transition between display modes. For example, a user may initiate an activation event that results in the screen 100 transitioning from the shrink mode to the expanded mode. Likewise, the user may initiate an activation event that results in the screen 100 transitioning from the expanded mode to the shrink mode. As described hereinafter, during the activation event, the intermediate or fan-out mode may be displayed to the user.

In one example, the screen 100 may initially display to the user the folder icon 102 and the file icons 104(1)-104(n) in the shrink mode, as shown in FIG. 1A, where the file icons 104(1)-104(n) are depicted as residing "inside" the folder icon 102. The user may desire to view all of the icons within the folder icon 102, and thus, the user may intend to transition from the shrink mode to the expanded mode. In order to accomplish this, the user may touch his or her finger to a first location on the screen 100 where the folder icon 102 is located. While maintaining contact with the screen 100, the user may then drag his or her finger to a second location. As the user drags his or her finger, the screen 100 displays to the user the intermediate mode. While the activation event is still present (e.g., as the finger moves along the screen 100), the electronic device 101 determines whether to transition the display mode to the expanded mode.

As stated above, the electronic device 101 has two steady state display modes: the shrink mode and the expanded mode. Thus, the electronic device 101 designates or keeps track of the current steady state display mode. In the example above, if the screen 100 initially displays the folder icon 102 and the file icons 104(1)-104(n) in the shrink mode, the electronic device initially designates the current steady state display mode as the shrink mode. Once the activation event begins, the intermediate mode is displayed to the user for the duration of the activation event until the electronic device either changes the designation of the current steady state display mode from the shrink mode to the expanded mode or determines that the activation event has ended. If the activation event ends and the designation of the current steady state display mode has not changed, the screen 100 transitions from displaying to the user the intermediate mode to displaying the display mode associated with the current steady state display mode (e.g., the shrink mode in this example) that was designated before the activation event began. Thus, when the electronic device 101 decides not to change the steady state display mode, the screen 100 "pulls back" the display from the intermediate mode to the original steady state display mode.

Figure 3A:
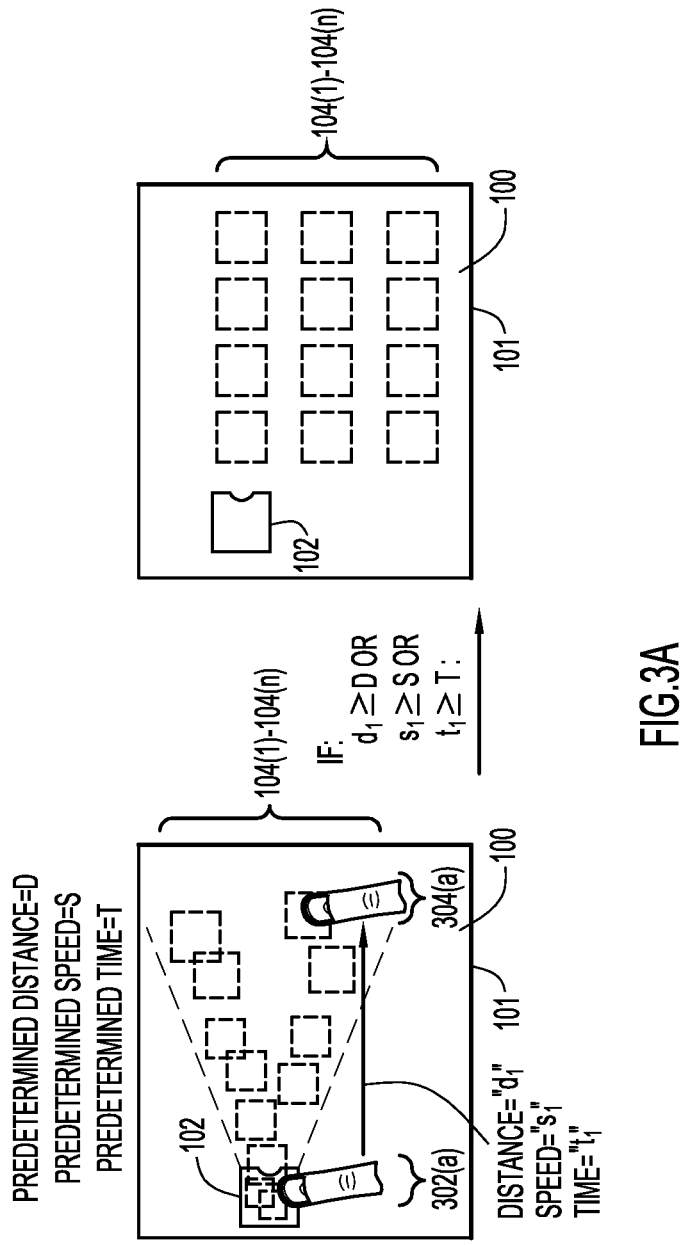

Reference is now made to FIGS. 3A-3C. FIGS. 3A-3C show the screen 100 transitioning between multiple display modes and the attributes or characteristics of an activation event that provoke the transitioning between display modes. Specifically, FIG. 3A shows the screen 100 transitioning between the shrink mode and the expanded mode (and displaying the intermediate mode during the transition). In other words, in FIG. 3A, the electronic device 101 changes the designation of the current steady state display mode from the shrink mode to the expanded mode, and thus, upon this change in designation, the screen 100 transitions to the expanded mode. FIG. 3B shows an attempted transition between the shrink mode and the expanded mode. In FIG. 3B, the transition between the shrink mode and the expanded mode "fails" (i.e., the electronic device 101 does not change the designation of the current steady state display mode from the shrink mode to the expanded mode). Thus, in FIG. 3B, during the activation event, the screen 100 displays the intermediate mode, and once the activation event ends, the screen 100 displays to the user the shrink mode (which was previous displayed to the user before the activation event was initiated). In FIG. 3C, the screen 100 transitions between the expanded mode and the shrink mode. In FIG. 3C, the electronic device 101 changes the designation of the current steady state display mode from the expanded mode to the shrink mode. Though not shown in FIG. 3C, the intermediate mode may be displayed to the user during the transition between the expanded mode and the display mode.

As stated above, in order for the electronic device 101 to determine whether or not to transition the screen 100 from one steady state display mode to another, the electronic device must determine whether attributes of the activation event are sufficient to warrant the transition. In one embodiment, the electronic device may measure a distance, speed or time of the activation event and compare it to a predetermined distance, speed or time in order to determine whether or not to switch display modes.

For example, in FIG. 3A, the user initiates an activation event by first touching the user's finger to the screen 100 at a first location, depicted at reference numeral 302(a), where the folder icon 102 is located. The user then maintains contact with the screen 100 and drags his or her finger across the screen 100 to a second location depicted at reference numeral 304(a). As the user's finger drags along the screen 100, the file icons 104(1)-104(n) emerge from the folder icon 102 and fan out across the screen 100, thus displaying the icons to the user in the intermediate or fan-out mode. Attributes of the file icons 104(1)-104(n) may change based on the proximity of the user's finger to the location of the folder icon 102. For example, as the user's finger moves further away from the location of the folder icon 102, the file icons 104(1)-104(n) correspondingly increase in size and angular orientation such that the file icons 104(1)-104(n) occupy a larger portion of the screen 100 when compared to the user's finger being closer to the location of the folder icon 102.

As the user performs the activation event (e.g., the "touch-and-drag" action), the electronic device 101 measures attributes of the activation event. For example, the electronic device 101 may measure the distance, $d_1$, in FIG. 3A that the user's finger is dragged along the screen 100 by measuring the number of pixels between the first location 302(a) and the second location 304(a). Likewise, the electronic device 101 may measure the distance, $d_2$, in FIG. 3B by measuring the number of pixels between the first location 302(b) and the second location 304(b), and so on for distance $d_3$ in FIG. 3C. The electronic device 101 may also measure the speed ($s_1$-$s_3$ in FIGS. 3A-3C) that the user's finger is dragged along the screen 100 by measuring the number of pixels between the first location and the second location over the time lapsed during the dragging action. Additionally, the electronic device 101 may measure the time, ($t_1$-$t_3$ in FIGS. 3A-3C) that the activation event has occurred by measuring the time lapsed from the start of the activation event.

The electronic device 101 may compare these calculated values to predetermined or pre-stored values to determine whether or not to transition between steady state display modes. For example, the electronic device 101 may be configured with a predetermined distance value of D pixels, a predetermined speed value of S pixels/time and a predetermined time value of T seconds. As shown in FIGS. 3A and 3C, if the values associated with the activation event are greater than or equal to these predetermined values, the electronic device 101 will change the designation of the current steady state display mode and will switch or transition the screen 100 to the appropriate display mode (e.g., the expanded display mode in FIG. 3A or the shrink display mode in FIG. 3C). However, as shown in FIG. 3B, if the values associated with the activation event are less than these predetermined values, the electronic device 101 will not change the designation of the current steady state display mode, and thus, the electronic device 101 will not transition the screen 100 to a new display mode. Instead, after the activation event is terminated, the screen 100 will revert back to the shrink display mode (e.g., the display mode that was designated as the current steady state display mode before the activation event was initiated). As stated above, when an activation event is initiated, the screen 100 will display the intermediate mode/fan-out mode to the user. Thus, the screen 100 will display the initial display mode (before the activation event) and then the intermediate display mode (during the activation event), and based on the attributes of the activation event, the screen 100 will display either a new steady state display mode or will revert to the current steady state display mode (the previous display mode before the activation event) after the activation event has terminated.

In one example, the electronic device assigns a "shrink value" to the activation event. The shrink value may be a value between zero and one, and may correspond to a distance, speed or time of the activation event. Based on the shrink value, the electronic device may determine whether or not to switch or transition the screen 100 to a new steady state display mode (e.g., the expanded mode or shrink mode, as in FIGS. 3A and 3C, respectively) or to revert back to the current steady state display mode (e.g., the shrink mode, as in FIG. 3B). For example, when the shrink value is zero, the electronic device will switch the screen 100 to the expanded display mode, and when the shrink value is one, the electronic device will switch or maintain the screen 100 in the shrink display mode.

The shrink value may be calculated by the following formula:

$$\sigma = (a*d) + (b*s) + (c*t)$$

where σ represents the shrink value, a, b and c represent weighting coefficients, d represents the distance attribute of the activation event, s represents the speed attribute of the activation event and t represents the time attribute of the activation event.

As stated above, in the intermediate mode, the file icons 104(1)-104(n) are displayed to the user as fanning out from the folder icon 102 across the screen 100 during the activation event. FIGS. 3A and 3B show the intermediate display mode being displayed to the user as the electronic device 101 determines whether or not to transition the screen 100 from one steady state display mode to the other steady state display mode (e.g., the shrink mode to the expanded mode).

In the intermediate mode, as the user touches and drags his or her finger along the screen 100, the file icons 104(1)-104(n) fan or expand across the screen. The extent of this fanning or expanding appearance depends on the shrink value calculated based on the activation event attributes, as described above. For example, as the user's finger travels across a larger distance along the screen 100, the file icons 104(1)-104(n) fan or expand to occupy a greater space on the screen 100 until the electronic device determines that the shrink value is sufficient to switch the display mode, and accordingly, the screen 100 then switches to the appropriate display mode. If the shrink value is not sufficient to switch the display mode, when the user releases his or her finger from the screen 100, the file icons 104(1)-104(n) move back ("snap back" or "pull back") into the folder icon 102 (e.g., the folder icon from which they originated). In one example, a relatively low shrink value corresponds to the file icons 104(1)-104(n) expanding to a relatively larger area across the screen 100 when compared to a relatively high shrink value.

The shrink value also determines how attributes of the file icons 104(1)-104(n) are displayed to the user in the intermediate mode. For example, based on the shrink value, the angular arrangement, opacity, size, etc. of the file icons 104(1)-104(n) may change. In one example, when the shrink value is relatively low, the file icons 104(1)-104(n) may be larger and more transparent as they fan out from the folder icon 102 across the screen 100 compared to when the shrink value is relatively high. On the other hand, when the shrink value is relatively high, the file icons 104(1)-104(n) may be smaller, may overlap more with one another and may be more opaque as they fan out from the folder icon 102.

Figure 4:
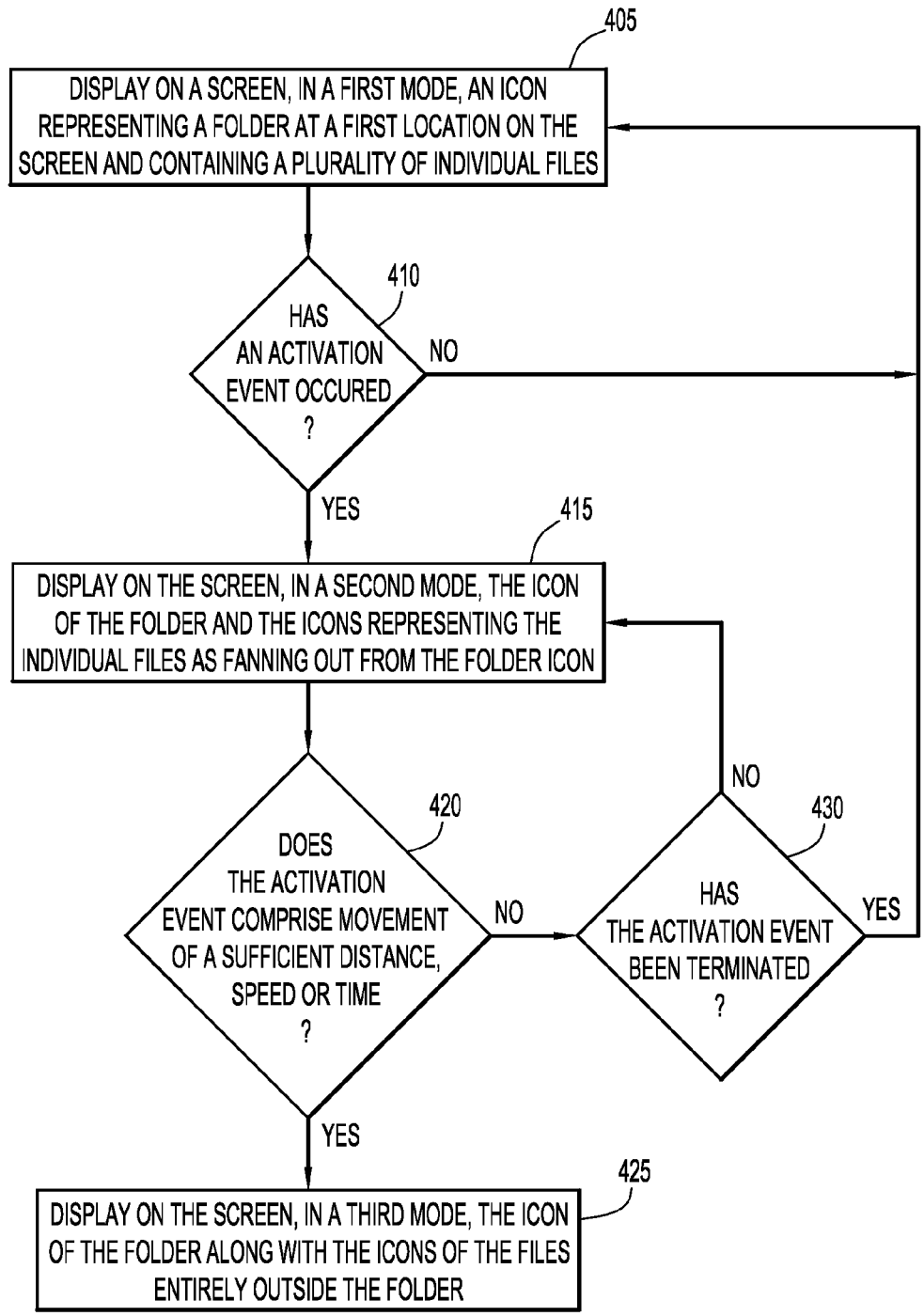
FIG. 4 is an example flow chart depicting operations of the activation detection and display configuration logic to transition between display modes.

Reference is now made to FIG. 4. FIG. 4 shows an example flow chart depicting operations to display the files in one of the display modes. At operation 405, an icon representing a folder is displayed on the screen 100 at a first location on the screen 100. The folder icon contains a plurality of individual files. At operation 410, the electronic device 101 determines whether an activation event has occurred. If so, the electronic device 101 displays on the screen 100, in a second mode, the icon of the folder and icons representing the individual files (file icons 104(1)-104(n)) as fanning out from the folder icon 102. If an activation event has not occurred (e.g., the answer to decision 410 is "no"), the process reverts to operation 405. After the folder icon and the file icons are displayed in the second mode, the electronic device 101, at operation 420, determines whether or not the activation event comprises movement of a sufficient distance, speed or time. If so, the electronic device 101, at operation 425, displays on the screen 100, in a third mode, the icon of the folder along with the icons of the files entirely outside the folder. If the activation event does not comprise movement of a sufficient distance, speed or time, at operation 430, the electronic device 101 determines whether or not the activation event has terminated. If the activation event has terminated, the process reverts to operation 405. If the activation event has not terminated, the process reverts to operation 415.

The above description is intended by way of example only.

What is claimed is:

1. A method comprising:
    displaying on a screen, in a first mode, a folder icon at a first location on the screen, the folder icon being indicative of a folder containing a plurality of individual files;
    detecting an activation event comprising movement from the first location on the screen to a second location on the screen;
    calculating a shrink value based on the movement;
    in response to detecting the activation event, displaying on the screen the folder icon along with icons representing the individual files on the screen; and
    adjusting appearance of the icons of the individual files based on the shrink value such that for selected shrink values, the icons of the individual files appear larger and occupy greater area on the screen when compared to other shrink values.

2. The method of claim 1, wherein displaying the folder icon along with the icons representing the individual files comprises displaying, in a fan-out mode, the folder icon along with the icons of the individual files such that the icons of the individual files are fanned out from the folder icon across the screen.

3. The method of claim 1, wherein displaying the folder icon along with the icons representing the individual files comprises displaying, in an expanded mode, the folder icon along with the icons of the individual files such that the icons of the individual files are displayed entirely outside of the folder icon.

4. The method of claim 1, wherein displaying the folder icon in the first mode comprises displaying a plurality of other folder icons in the first mode.

5. The method of claim 1, wherein the screen is a touch screen and wherein detecting comprises detecting a touch on the touch screen.

6. The method of claim 1, wherein calculating the shrink value comprises calculating the shrink value based on at least one of a distance, speed and time of the movement from the first location on the screen to the second location on the screen.

7. The method of claim 1, wherein the plurality of individual files comprise one or more of: picture files, audio files, video files and document files.

8. The method of claim 1, wherein displaying the folder icon at the first location comprises displaying the folder icon in a shrink mode.

9. One or more computer-readable storage media encoded with instructions that, when executed, are operable to:
- display on a screen, in a first mode, a folder icon at a first location on the screen, the folder icon being indicative of a folder containing a plurality of individual files;
- detect an activation event comprising movement from the first location on the screen to a second location on the screen;
- calculate a shrink value based on the movement;
- display on the screen the folder icon along with icons representing the individual files on the screen in response to detecting the activation event; and
- adjust the appearance of the icons of the individual files based on the shrink value such that for selected shrink values, the icons of the individual files appear larger and occupy greater area on the screen when compared to other shrink values.

10. The computer readable storage media of claim 9, wherein the instructions operable to display the folder icon along with the icons representing the individual files comprise displaying, in a fan-out mode, the folder icon along with icons of the individual files such that icons of the individual files are fanned out from the folder icon across the screen.

11. The computer readable storage media of claim 9, wherein the instructions operable to display the folder icon along with the icons representing the individual files comprise displaying in an expanded mode, the folder icon along with icons of the individual files such that the icons of the individual files are displayed entirely outside of the folder icon.

12. The computer readable storage media of claim 9, wherein the instructions operable to calculate comprise instructions operable to calculate the shrink value based on at least one of distance, speed and time of the movement from the first location on the screen to the second location on the screen.

13. The computer readable storage media of claim 9, wherein the instructions operable to display the folder icon at the first location comprise instructions operable to display the folder icon in a shrink mode.

14. An apparatus, comprising:
- an interface unit;
- a screen; and
- a processor coupled to the interface unit and the screen and configured to:
- display on a screen, in a first mode, a folder icon at a first location on the screen, the folder icon being indicative of a folder containing a plurality of individual files;
- detect an activation event comprising movement from the first location on the screen to a second location on the screen; and
- display on the screen the folder icon along with icons representing the individual files on the screen in response to detecting the activation event,
- wherein the processor is further configured to calculate a shrink value based on the movement, wherein the shrink value is calculated based on at least one of a distance, speed and time of the movement from the first location on the screen to the second location on the screen, and
- to adjust the appearance of the icons of the individual files based on the shrink value such that for selected shrink values, the icons of the individual files appear larger and occupy greater area on the screen when compared to other shrink values.

15. The apparatus of claim 14, wherein the processor is further configured to display, in a fan-out mode, the folder icon along with icons of the individual files such that icons of the individual files are fanned out from the folder icon across the screen.

16. The apparatus of claim 14, wherein the processor is further configured to display, in an expanded mode, the folder icon along with icons of the individual files such that the icons of the individual files are displayed entirely outside of the folder icon.

17. The apparatus of claim 14, wherein the processor is further configured to calculate a shrink value based on the movement, wherein the shrink value is calculated based on at least one of a distance, speed and time of the movement from the first location on the screen to the second location on the screen.

* * * * *